United States Patent
Laule et al.

(10) Patent No.: US 10,876,666 B2
(45) Date of Patent: Dec. 29, 2020

(54) CONNECTING ELEMENT FOR CONNECTING A PIPE TO A COMPONENT OF AN AIR-CONDITIONING SYSTEM

(71) Applicant: TI AUTOMOTIVE ENGINEERING CENTRE (HEIDELBERG) GMBH, Heidelberg (DE)

(72) Inventors: Wolfgang Laule, Reilingen (DE); Dominik Kempf, Frankfurt am Main (DE); Boris Bernhardt, Heppenheim (DE)

(73) Assignee: TI AUTOMOTIVE ENGINEERING CENTRE (HEIDELBERG) GMBH, Heidelberg (DE)

( * ) Notice: Subject to any disclaimer, the term of this patent is extended or adjusted under 35 U.S.C. 154(b) by 152 days.

(21) Appl. No.: 15/740,584

(22) PCT Filed: Jun. 30, 2016

(86) PCT No.: PCT/EP2016/065435
§ 371 (c)(1),
(2) Date: Dec. 28, 2017

(87) PCT Pub. No.: WO2017/001633
PCT Pub. Date: Jan. 5, 2017

(65) Prior Publication Data
US 2018/0187814 A1    Jul. 5, 2018

(30) Foreign Application Priority Data

Jul. 1, 2015    (DE) .................... 20 2015 103 455 U

(51) Int. Cl.
*F16L 41/08*    (2006.01)
*F16L 47/26*    (2006.01)
(Continued)

(52) U.S. Cl.
CPC ........ *F16L 41/086* (2013.01); *B29C 45/1676* (2013.01); *B60H 1/00571* (2013.01);
(Continued)

(58) Field of Classification Search
CPC ......... F16L 41/086; F16L 41/08; F16L 39/00; F16L 39/005; F16L 47/28; F16L 21/02;
(Continued)

(56) References Cited

U.S. PATENT DOCUMENTS 2,461,414 A * 2/1949 Donner .................... F16L 49/02
                                                              285/93
4,289,334 A * 9/1981 Riley ..................... F16L 58/188
                                                              285/141.1
(Continued)

FOREIGN PATENT DOCUMENTS

DE    10163931 A1    7/2003
EP    0 151 519 A1    8/1985
(Continued)

OTHER PUBLICATIONS

International Search Report from corresponding PCT application No. PCT/EP2016/065435 dated Oct. 6, 2016 (2 pgs).

*Primary Examiner* — Aaron M Dunwoody
(74) *Attorney, Agent, or Firm* — Dickinson Wright PLLC

(57) ABSTRACT

The invention pertains to a connecting element (1) for connecting a pipe end (2) to a component (3) of an air-conditioning system, wherein said connecting element comprises a base body (4) with a passage opening (5) for conveying through a refrigerant, a receptacle bore (6) for receiving the pipe end (2), wherein the receptacle bore (6) is arranged on a face side (7) of the base body (4) and corresponds to the passage bore (5), as well as a connection piece (8) that is arranged on the other face side (9) of the base body (4) and corresponds to the passage bore (5) on this (Continued)

side, wherein the connection piece (8) and the base body (4) consist of the same material and are realized in one piece, wherein at least one sealing element (12, 13) is arranged on the connection piece (8), and wherein the sealing element (12, 13) and the connection piece (8) are realized in one piece, as well as to a method for manufacturing such a connecting element.

11 Claims, 4 Drawing Sheets

(51) Int. Cl.
| | |
|---|---|
| *B29C 45/16* | (2006.01) |
| *B60H 1/00* | (2006.01) |
| *F16L 21/035* | (2006.01) |
| *F24F 13/30* | (2006.01) |
| *F16L 21/02* | (2006.01) |
| *B29K 23/00* | (2006.01) |

(52) U.S. Cl.
CPC ............ *F16L 21/035* (2013.01); *F16L 47/26* (2013.01); *F24F 13/30* (2013.01); *B29K 2023/12* (2013.01); *B29K 2023/16* (2013.01); *B29K 2995/0046* (2013.01); *F16L 21/02* (2013.01)

(58) Field of Classification Search
CPC ....... F16L 21/022; F16L 21/035; F16L 23/18; F16L 41/088; F16L 41/12
USPC ...... 285/124.2, 124.3, 124.4, 204, 205, 351, 285/201, 206, 207, 208
See application file for complete search history.

(56) References Cited

U.S. PATENT DOCUMENTS

| | | | | |
|---|---|---|---|---|
| 4,569,540 | A * | 2/1986 | Beson ..................... | E21B 33/04 285/123.13 |
| 4,907,651 | A * | 3/1990 | Bou-Mikael ........ | E21B 33/1212 166/114 |
| 5,180,005 | A * | 1/1993 | Marsais ................ | F28F 9/0246 165/178 |
| 6,386,593 | B1 * | 5/2002 | Slais ................... | B60H 1/00571 277/609 |
| 6,443,502 | B1 | 9/2002 | Iida et al. | |
| 6,890,005 | B1 * | 5/2005 | Chisnell .................. | F16L 19/02 285/124.1 |
| 2003/0214130 | A1 * | 11/2003 | Schroeder .......... | B60H 1/00571 285/205 |
| 2006/0170210 | A1 * | 8/2006 | Gross .................... | E03C 1/0408 285/138.1 |
| 2007/0085339 | A1 * | 4/2007 | Tsuji ..................... | E02F 9/2267 285/133.4 |
| 2007/0236008 | A1 * | 10/2007 | Kim ........................ | F16L 23/18 285/206 |
| 2008/0315457 | A1 * | 12/2008 | Ueki ..................... | B29C 33/485 264/299 |
| 2014/0300105 | A1 * | 10/2014 | Kalbacher ............ | F16L 21/035 285/351 |
| 2019/0086004 | A1 * | 3/2019 | Koster .................. | F16L 58/187 |

FOREIGN PATENT DOCUMENTS

| | | |
|---|---|---|
| EP | 1 843 072 A2 | 10/2007 |
| JP | 2001/004251 A | 1/2001 |
| JP | 2007/107585 A | 4/2007 |
| JP | 2008/101788 A | 5/2008 |
| WO | 2013/054815 A1 | 4/2013 |

* cited by examiner

CONNECTING ELEMENT FOR CONNECTING A PIPE TO A COMPONENT OF AN AIR-CONDITIONING SYSTEM

CROSS-REFERENCE TO RELATED APPLICATIONS

This application is a 35 U.S.C. § 371 national phase filing of International Patent Application No. PCT/EP2016/065435, filed Jun. 30, 2016, through which and to which priority is claimed under 35 U.S.C. § 119 to European Patent Application No. 20 2015 103 455.5, filed Jul. 1, 2015, the entire disclosure of which is hereby expressly incorporated by reference.

FIELD

The invention pertains to a connecting element for connecting a pipe end to a component of an air-conditioning system, wherein said connecting element comprises a base body with a passage opening for conveying through a refrigerant, a receptacle bore for receiving the pipe end, wherein the receptacle bore is arranged on a face side of the base body and corresponds to the passage bore, as well as a connection piece that is arranged on the other face side of the base body and corresponds to the passage bore on this side, wherein the connection piece and the base body consist of the same material and are realized in one piece, and wherein at least one sealing element is arranged on the connection piece.

BACKGROUND

The components of an air-conditioning system such as, for example, the compressor, the condenser, the evaporator, the dehumidifier and the expansion valve are connected to one another by means of pipes or hoses if they do not form a preassembled unit. Depending on the pressure conditions, plastic pipes are also frequently used in this case. Such plastic pipes are particularly advantageous if not only the compactness, but also the weight of mobile air-conditioning systems is an important factor. A connecting element is used in order to connect a plastic pipe to a component of the air-conditioning system. In this case, the pipe end is inserted into the receptacle bore of the connecting element and the pipe end is integrally and tightly connected to the connecting element by means of a bonded or welded joint. The connecting element is ultimately connected to the component of the air-conditioning system and fixed thereon by means of the connection piece. The connection between the connecting element and the component of the air-conditioning system also must be tight such that no loss of refrigerant occurs. For this purpose, it was known from the prior art to provide the connection piece with circumferential depressions for accommodating O-rings. After the installation, the O-rings tightly adjoin the connection piece and the component of the air-conditioning system. In this case, it is problematic that the diameter of the O-ring must be chosen such that a permanently tight connection is produced. However, this is frequently associated with a complicated installation. Furthermore, O-rings may slide out of the depression during the installation and thereby be lost or damaged. Consequently, the connecting point may not be tightly sealed after the installation and allow the escape of environmentally harmful refrigerant.

The invention is based on the objective of making available a connecting element for connecting a pipe end to a component of an air-conditioning system, wherein said connecting element can be installed without any problems and ensures that the air-conditioning system is tightly sealed. This objective is attained with the characteristics of claim 1. The dependent claims refer to advantageous embodiments of the invention.

SUMMARY

The objective of the invention is attained by realizing the connection piece and the sealing element in one piece. This means that the sealing element is integrally formed on the connection piece. In this way, it is captively connected to the connection piece such that flawed installations due to faulty sealing elements are precluded. The sealing element can furthermore be prevented from sliding out of its intended position such that leaks resulting thereof can also be precluded. Another advantage can be seen in that the manufacture of such a connecting element is particularly simple because the sealing element can be arranged on the connecting element during its manufacture. This eliminates additional steps for installing the sealing element on the connecting element. The connection piece may comprise a pipe section and a radial flange. In such an embodiment, the pipe section is inserted into a bore of the component of the air-conditioning system and the connection piece adjoins the outer side of the component. This results in a defined installation and a rigid seat of the connecting element.

In this case, a first seal may be assigned to the pipe section. Such a seal acts in the radial direction and after the installation tightly adjoins the bore of the component of the air-conditioning system with radial prestress.

A second seal may be assigned to the radial flange. Such a seal acts in the axial direction and improves the sealing effect of the overall system. A particularly sound sealing effect is achieved if the connecting element is rigidly connected to the component of the air-conditioning system.

The base body is advantageously provided with a fastening device for fastening the base body on the component. This allows a particularly rigid connection of the connecting element to the component of the air-conditioning system. A particularly sound sealing effect is furthermore achieved in this embodiment with the second seal. An inadvertent separation of the connecting element can be prevented in this embodiment.

The pipe end may be integrally connected to the base body. For this purpose, the pipe end may be connected to the connecting element in a permanently tight and stable fashion by means of a bonded joint or a welded joint produced, for example, by means of rotary friction welding. The base body and the connection piece preferably consist of injection-mouldable plastic. In this way, the connecting element can be easily and cost-effectively manufactured.

Polymer materials, particularly polyamide (PA) such as, for example, polyamide-6 (PA 6), are particularly suitable materials for the connecting element. The plastic may be provided with a fiber reinforcement in order to increase its strength. In this respect, it would be conceivable, in particular, to use glass fibers as a fiber reinforcement. A plastic reinforced with glass fibers, particularly a polyamide reinforced with glass fibers, is a particularly stable and pressure-resistant plastic.

The at least one sealing element may consist of an injection-mouldable elastomer. In this way, the complete connecting element consisting of the base body and the sealing element can be manufactured in one process in the same injection moulding machine.

Particularly thermoplastic elastomers on the basis of olefin such as, for example, a mixture of polypropylene and ethylene-propylene-diene-rubber (PP/EPDM) may be considered as injection-mouldable elastomer. These materials can be processed in conventional injection moulding machines and have a sound resistance to conventional refrigerants. These materials furthermore have a permanent elasticity over a broad temperature spectrum such that a permanently tight seal is ensured.

The at least one sealing element preferably is integrally connected to the connection piece. The integral connection is preferably produced during the manufacture of the sealing element by means of injection moulding. In this case, a heated and thereby liquefied elastomer is injected into the cavity that forms the sealing element, wherein the base body forms part of the wall of this cavity. This causes the material of the base body to fuse at least superficially such that a rigid integral connection between the base body and the sealing element is produced. This results in a rigidly connected sealing element.

In the inventive method for manufacturing a connecting element for connecting a pipe end to a component of an air-conditioning system, an injection-mouldable plastic for manufacturing a base body with connection piece is in a first step fed to an injection moulding device and an injection-mouldable elastomer for manufacturing at least one sealing element integrally formed on the base body is subsequently fed to the injection moulding device prior to the removal of the base body from the injection moulding device.

In the inventive method, a connecting element is therefore manufactured together with its sealing element in one process. The inventive method thereby allows the cost-effective manufacture of connecting elements that can be installed in a particularly simple and reliable fashion due to their rigidly connected sealing elements.

BRIEF DESCRIPTION OF THE DRAWINGS

A few embodiments of the inventive connecting element are described in greater detail below with reference to the figures. In these schematic figures.

DETAILED DESCRIPTIONS

Figure 1:
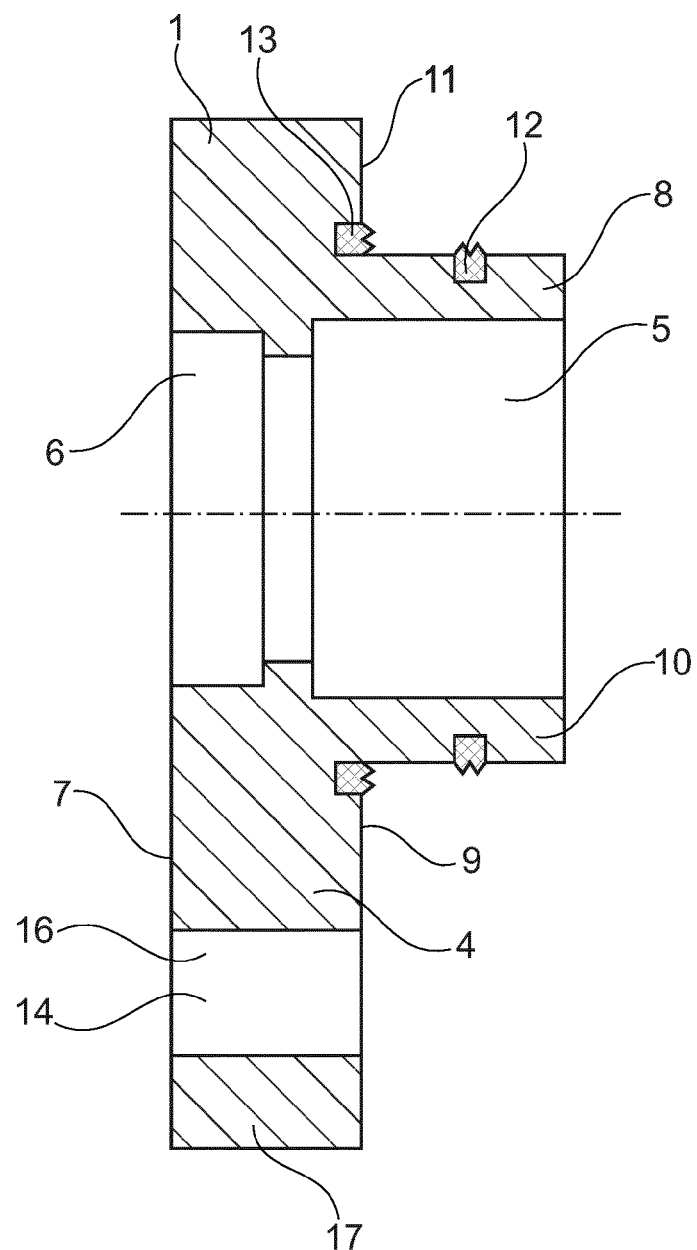
FIG. 1 shows a section through a connecting element.
Figure 2:
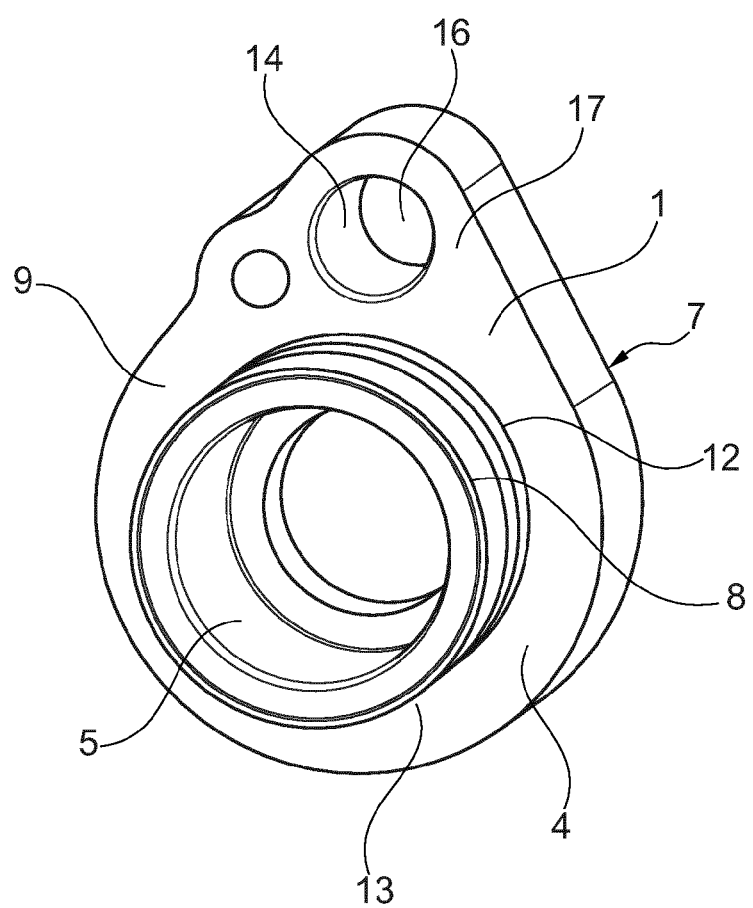
FIG. 2 shows a three-dimensional view of the connecting element.
Figure 3:
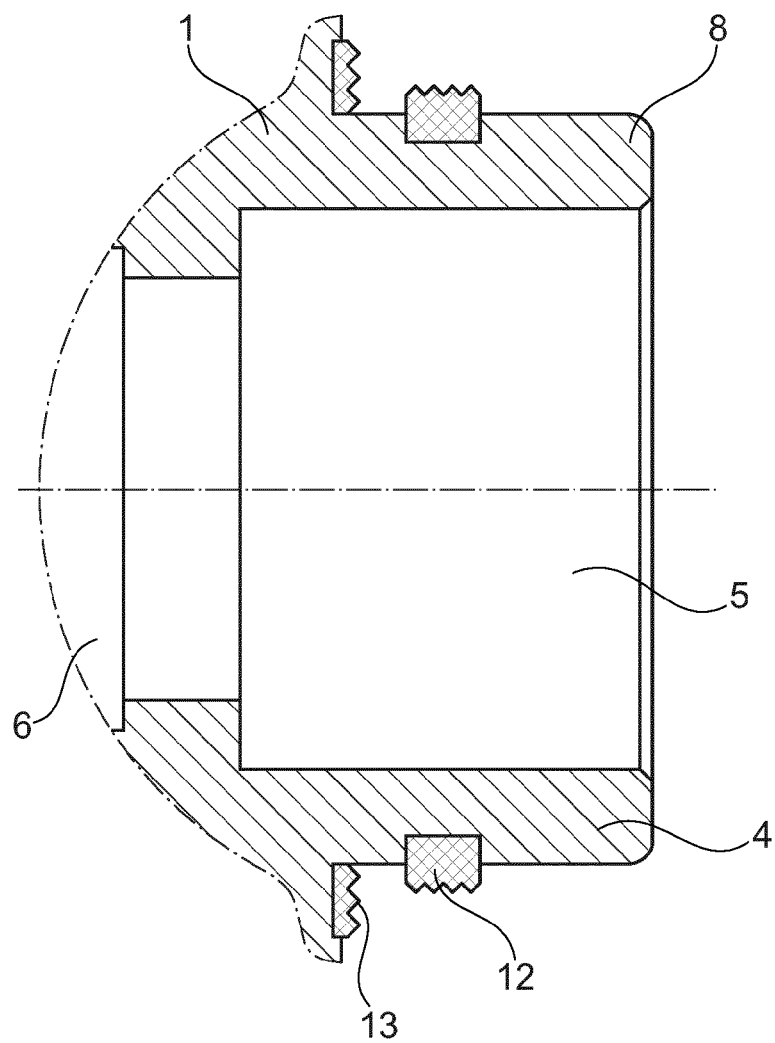
FIG. 3 shows a detail of the sealing region of the connecting element illustrated in FIG. 1.

FIGS. 1 to 3 show a connecting element 1 for connecting a pipe end 2 to a component 3 of an air-conditioning system. The connecting element 1 comprises a base body 4 with a passage opening 5 for conveying through a refrigerant and a receptacle bore 6 for receiving the pipe end 2, wherein the receptacle bore 6 is arranged on a face side 7 of the base body 4 and corresponds to the passage bore 5. The passage bore 5 and the receptacle bore 6 are arranged concentric to one another.

The connecting element 1 furthermore features a connection piece 8 that is arranged on the other face side 9 of the base body 4 and corresponds to the passage bore 5 on this side, wherein the connection piece 8 and the base body 4 consist of the same material and are realized in one piece. The connection piece 8 and the passage bore 5 are arranged concentric to one another. The connection piece 8 comprises a pipe section 10 and a radial flange 11.

Two sealing elements 12, 13 are arranged on the connection piece 8 and realized integrally with the connection piece 8. In this case, a first seal 12 is assigned to the pipe section 8 and a second seal is assigned to the radial flange 13.

The base body 4 is provided with a fastening device 14 for fastening the base body 4 on the component 3.

The base body 4 and the connection piece 8 consist of an injection-mouldable plastic and the two sealing elements 12, 13 consist of an injection-mouldable elastomer. The sealing elements 12, 13 are integrally connected to the connection piece 8 in this case.

Figure 4:
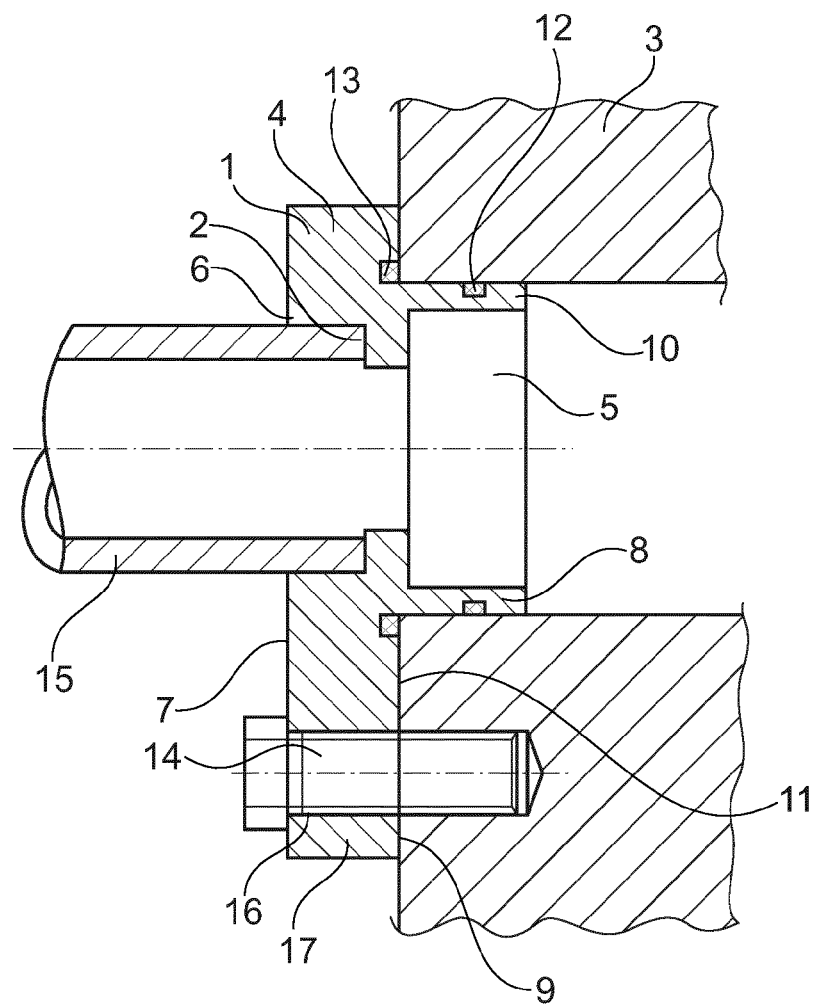
FIG. 4 shows an arrangement with a pipe, a connecting element and a component of an air-conditioning system.

FIG. 4 shows an arrangement with the above-described connecting element 1 that produces a connection between a pipe 15, in this case a plastic pipe of polyamide, preferably an extruded multi-layer polyamide pipe, and a component 3 of an air-conditioning system such as, for example, the condenser.

In this case, the pipe end 2 of the pipe 15 is integrally connected to the base body 4 of the connecting element 1. For this purpose, the pipe 15 may be fixed on the base body 4, for example, by means of friction welding or rotary friction welding.

The component 3 of the air-conditioning system features an opening for receiving the connection piece 8 of the connecting element 1. The respective sealing elements 12, 13 tightly adjoin the inner wall of the opening and the outer wall of the component in this case. The connecting element 1 is rigidly connected to the component 3 by means of the fastening device 14. The fastening device features an additional passage bore 16 that is arranged in a projection 17 of the base body 4. A fastening means, preferably a screw, is inserted through the passage bore 16 and fastened in the component 3. In this way, the connecting element 1 with the pipe 15 is reliably and rigidly fixed on the component 3.

In the inventive method for manufacturing a connecting element 1 for connecting a pipe end 2 to a component 3 of an air-conditioning system, an injection-mouldable plastic for manufacturing a base body 4 with connection piece 8 is in a first step fed to an injection moulding device and an injection-mouldable elastomer for manufacturing at least one sealing element 12, 13 integrally formed on the base body 4 is subsequently fed to the injection moulding device prior to the removal of the base body 4 from the injection moulding device. A connecting element 1 with sealing elements 12, 13 integrally formed on its base body 4 is thereby manufactured.

The invention claimed is:

1. A connecting element for connecting a pipe end to a component of an air-conditioning system, comprising a base body with a passage opening for conveying through a refrigerant, and a receptacle bore for receiving the pipe end, wherein the receptacle bore is arranged on a face side of the base body and corresponds to the passage bore, as well as a connection piece that is arranged on the other face side of the base body and corresponds to the passage bore on this side, wherein the connection piece and the base body consist of the same material and are realized in one piece, wherein two sealing elements are arranged on the connection piece, wherein the two sealing elements and the connection piece are realized in one piece, wherein the connection piece comprises a pipe section and a radial flange, wherein a first seal of the sealing elements is assigned to the pipe section, a second seal of the sealing elements is assigned to the radial flange, and the first and second seals are positioned in first and second grooves formed on the pipe section and radial flange, respectively, wherein the first groove faces radially and the second groove faces axially, and wherein an additional passage bore is arranged in a projection of the base body.

2. The connecting element according to claim 1, characterized in that the base body is provided with a fastening device for fastening the base body on the component through the additional passage bore.

3. The connecting element according to claim 1, characterized in that the pipe end is integrally connected to the base body.

4. The connecting element according to claim 1, characterized in that the base body and the connection piece consist of an injection-mouldable plastic.

5. The connecting element according to claim 1, characterized in that the two sealing elements consists of an injection-mouldable elastomer.

6. The connecting element according to claim 1, characterized in that the two sealing elements are integrally connected to the connection piece.

7. The connecting element according to claim 1, characterized in that the first and second grooves and the first and second seals are sized and positioned relative to each other such that the first seal only compresses radially for radial sealing, and the second seal only compresses axially for axial sealing.

8. The connecting element according to claim 1, characterized in that the first and second sealing elements are injection molded into the first and second grooves such that the sealing elements and the connection piece are realized in one piece.

9. The connecting element according to claim 8, characterized in that the first and second sealing elements are molded to completely fill the first and second grooves.

10. The connecting element according to claim 1, characterized in that the second sealing element is located radially outwardly of the first sealing element.

11. A connecting element for connecting a pipe end to a component of an air-conditioning system, comprising a base body with a passage opening for conveying through a refrigerant, and a receptacle bore for receiving the pipe end,
wherein the receptacle bore is arranged on a face side of the base body and corresponds to the passage bore, as well as a connection piece that is arranged on the other face side of the base body and corresponds to the passage bore on this side,
wherein the connection piece and the base body are formed as a same material and are realized in one piece as an injection-moldable plastic, and
wherein two sealing elements as an injection-moldable elastomer are integrally formed on the connection piece including the base body such that the two sealing elements and the connection piece including the base body are realized in one piece.

* * * * *